(12) United States Patent
Kuwayama (10) Patent No.: US 8,136,646 B2
(45) Date of Patent: Mar. 20, 2012

(54) CYLINDRICAL DYNAMIC DAMPER

(75) Inventor: Naohito Kuwayama, Nagoya (JP)

(73) Assignee: Tokai Rubber Industries, Ltd. (JP)

( * ) Notice: Subject to any disclaimer, the term of this patent is extended or adjusted under 35 U.S.C. 154(b) by 1364 days.

(21) Appl. No.: 11/739,686

(22) Filed: Apr. 24, 2007

(65) Prior Publication Data

US 2007/0251783 A1   Nov. 1, 2007

(30) Foreign Application Priority Data

Apr. 27, 2006 (JP) .................. 2006-124275
May 19, 2006 (JP) .................. 2006-140344

(51) Int. Cl.
*F16F 7/104* (2006.01)
*F16F 15/12* (2006.01)

(52) U.S. Cl. ........................ 188/379; 267/141

(58) Field of Classification Search ........... 188/379, 188/380, 381, 378; 267/141, 141.1–141.3; 464/180, 127; 74/574.4, 572.2; F16F 15/12
See application file for complete search history.

(56) References Cited

U.S. PATENT DOCUMENTS

| | | | |
|---|---|---|---|
| 5,996,959 A * | 12/1999 | Gassen et al. ............. | 248/635 |
| 6,308,810 B1 * | 10/2001 | Kuwayama ............... | 188/379 |
| 6,485,370 B1 * | 11/2002 | Kurosu et al. ............ | 464/180 |
| 6,682,060 B2 * | 1/2004 | Kato et al. ............... | 267/141 |
| 6,883,653 B2 * | 4/2005 | Kato et al. ............... | 188/379 |
| 6,981,579 B2 * | 1/2006 | Kuwayama et al. ....... | 188/379 |
| 2004/0041318 A1 * | 3/2004 | Kuwayama et al. ....... | 267/141.2 |

FOREIGN PATENT DOCUMENTS

| | | |
|---|---|---|
| JP | 2-18363 Y2 | 5/1990 |
| JP | 5-71503 U | 9/1993 |
| JP | 5-73338 U | 10/1993 |
| JP | 07-238990 A | 9/1995 |
| JP | 08-177976 A | 7/1996 |
| JP | 8-277883 A | 10/1996 |
| JP | 10-082452 A | 3/1998 |

* cited by examiner

*Primary Examiner* — Bradley King
*Assistant Examiner* — Thomas Irvin
(74) *Attorney, Agent, or Firm* — Rossi, Kimms & McDowell LLP (57) ABSTRACT

A cylindrical dynamic damper including: a cylindrical fastening member of elastic body to be fitted onto a rod shaped vibrating member; a mass member of tubular shape disposed about the cylindrical fastening member in a concentric fashion; a plurality of elastic connecting members disposed between the cylindrical fastening member and the mass member to extend in an axis-perpendicular direction; and a plurality of thin elastic film members disposed between and integrally formed with circumferentially adjacent ones of the elastic connecting members. The cylindrical fastening member and the mass member is elastically connected together via the elastic connecting members and the elastic film members. Each of the elastic film members is inclined to one axial side, and at least one of the elastic film members is inclined to an opposite axial side in comparison with the other elastic film members.

9 Claims, 4 Drawing Sheets

CYLINDRICAL DYNAMIC DAMPER

INCORPORATED BY REFERENCE

The disclosure of Japanese Patent Application No. 2006-124275 filed on Apr. 27, 2006, and No. 2006-140344 filed on May 19, 2006, each including the specification, drawings and abstract is incorporated herein by reference in its entirety.

BACKGROUND OF THE INVENTION

1. Field of the Invention

The present invention relates to a cylindrical dynamic damper that is mounted on hollow or solid rod shaped members such as a variety of shafts, arms and pipes, which are excited by means of vibration transmitting therethrough, and that is able to damp vibrations excited in the rod shaped vibrating member.

2. Description of the Related Art

A variety of rod shaped members including power transmitting members such as shaft and arms as well as pipes forming fluid passages are likely to cause problems of resonance themselves and vibration transmission therethrough. One of the known measures for these problems is a dynamic damper that is mounted on the rod shaped member.

JP-Y-2-18363 discloses one example of the dynamic damper wherein a cylindrical fastening member and a mass member are arranged in a concentric fashion, and elastically connected together by means of elastic connecting members formed of elastic body. The cylindrical fastening member is disposed about and fitted onto the rod shaped vibrating member so that the mass member is elastically supported on the rod shaped vibrating member via the elastic connecting members, thereby providing a secondary vibrating system with respect to the primary vibrating system of the rod shape vibrating member. This type of dynamic damper, for example, has been applied to an automotive drive shaft or the like.

In the dynamic damper as disclosed in JP-Y-2-18363, for example, a plurality of elastic connecting members are spaced away from one another in the circumferential direction, and a plurality of elastic film members of film shape are disposed between adjacent ones of elastic connecting members, respectively. That is, circumferential spacings between adjacent ones of the elastic connecting members are closed by means of these elastic film members, making it possible to prevent entry of the pebbles or the like into the gap between the elastic connecting members. Further, the presence of the circumferential spacing between adjacent ones of the elastic connecting members may pose the problem of burrs irregularly formed at around the parting line of a mold where mold halves faces are mated together. These burrs may cause deterioration in damping characteristics and/or durability of the dynamic damper. Forming the elastic film members is able to eliminate the presence of the parting line of the mold between adjacent ones of the elastic connecting members, thereby preventing deterioration in damping characteristics caused by the burs irregularly formed at around the parting line.

However, in the dynamic damper disclosed in JP-Y-2-18363, the elastic film members are likely to undergo compression/tensile deformation in accordance with the displacement of the mass member in the input direction of vibration to be damped. As a result, the elastic film members are prone to give an adverse effect against the spring constant of the secondary vibration system, even if these are made thin. Also, this makes it difficult to make a spring component in the secondary vibration system composed of the dynamic damper small, limiting a freedom in tuning the secondary vibration system. Further, a slight variation in the wall thickness of the elastic film members may cause a variation of the tuning frequency of the secondary vibration system, so that the dynamic damper may not provide a desired damping performance effectively.

To cope with this problem, the present assignee has been proposed in JP-A-8-277883 the improved dynamic damper wherein the elastic film members are formed in a bellows shape or an inclined plane shape, so that the elastic film members undergo shear deformation upon displacement of the mass member with respect to the rod shaped vibrating member in the axis-perpendicular direction. This improved dynamic damper is able to minimize adverse influence of the elastic film member on the spring constant of the secondary vibration system and the vibration damping characteristics of the dynamic damper during relative displacement between the mass member and the rod shaped vibrating member in the axis-perpendicular direction.

However, the extensive studies conducted by the present inventor have revealed that the dynamic damper disclosed in JP-A-8-277883 has still some room for improvement. Namely, with respect to the elastic film members of bellows like shape, if the radial distance between the cylindrical fastening member (or the rod shaped vibrating member) and the mass member is not large enough, upon input of large vibrational load, the elastic film members are folded up, possibly causing significant increase in the spring constant of the secondary vibration system. Furthermore, if the radial distance between the cylindrical fastening member and the mass member is made large enough, it becomes difficult to meet sufficiently the small-sizing requirement on the other hand. Thus, it might become difficult to employ the dynamic damper of construction as disclosed in JP-A-8-277883 depending on a kind of input vibration and/or a required space for installation.

With respect to the elastic film members of inclined plane shape, though the increase in the spring constant due to folded elastic film members can be avoided, the inclined elastic film members will cause a slant of an elastic principal axis of the spring component of the dynamic damper with respect to the axis-perpendicular direction that is the vibration input direction. Accordingly, the mass member is likely to cause swinging displacement in a prizing or twisting direction upon input of vibration, so that the undesirable displacement of the mass member in the directions except in the vibration input direction may possibly deteriorate desired vibration damping effect of the dynamic damper.

SUMMARY OF THE INVENTION

It is therefore one object of this invention to provide a cylindrical dynamic damper of novel construction that is able to minimize adverse effect of the elastic film members against the spring characteristics of the secondary vibration system, and is able to exhibit effective vibration damping action by efficiently utilizing excitation force due to displacement of the mass member.

The above and/or optional objects of this invention may be attained according to at least one of the following modes of the invention. The following modes and/or elements employed in each mode of the invention may be adopted at any possible optional combinations. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

A first mode of the present invention provides a cylindrical dynamic damper for installing on a rod shaped vibrating member, comprising: a cylindrical fastening member formed of an elastic body and adapted to be disposed about and fitted onto the rod shaped vibrating member; a mass member of tubular shape having a diameter larger than the cylindrical fastening member and disposed about the cylindrical fastening member in a concentric fashion; a plurality of elastic connecting members disposed between radially opposing faces of the cylindrical fastening member and the mass member at respective circumferential positions so as to extend in an axis-perpendicular direction; and a plurality of thin elastic film members disposed between and integrally formed with circumferentially adjacent ones of the elastic connecting members, the cylindrical fastening member and the mass member being elastically connected to each other by means of the elastic connecting members and the elastic film members so that the mass member is elastically supported by the rod shaped vibrating member, wherein each of the elastic film members is inclined to one axial side, and at least one of the elastic film members is inclined to an opposite axial side in comparison with an other elastic film members.

According to the cylindrical dynamic damper of this mode, each of the elastic connecting members is made thin, and is inclined to one axial side. Therefore, each elastic film member undergoes shear deformation upon displacement of the mass member in the axis-perpendicular direction. This arrangement makes it possible to minimize or eliminate adverse influence by the elastic film member against the spring characteristics of the secondary vibration system. Thus, the present cylindrical dynamic damper is able to exhibit desired damping action effectively against input vibration within the desired frequency range.

Further, at least one of the plurality of elastic film members is inclined to the opposite axial side in comparison with the other elastic film members. This makes it possible to prevent inclination of the elastic principal axis of the secondary vibration system, while utilizing the inclined elastic film members. Accordingly, it is possible to prevent the mass member from being displaced in the direction different from the vibration input direction upon input of vibrational load. Thus, the present cylindrical dynamic damper is able to exhibit desired vibration damping effect sufficiently.

The inclination of each elastic film member to one axial side should be interpreted to mean that a radially outside end of the elastic film member is dislocated to one side in the axial direction with respect to a radially inside end of the elastic film member. In the case where the radially outside end of the elastic film member is dislocated to the other side in the axial direction with respect to the radially inside end of the elastic film member, it means that the elastic film member is inclined to the opposite axial side in comparison with the other elastic film member whose radially outside end is dislocated to the one side in the axial direction with respect to its radially inside end.

A second mode of the present invention provides a cylindrical dynamic damper according to the first mode, wherein the cylindrical fastening member is formed with a pair of recesses formed on and extending along axial both sides of each of the elastic connecting members. According to this mode, in the case where the mass member is displaced in the axis-perpendicular direction and the elastic connecting member undergo compression deformation in the axis-perpendicular direction, expansion deformation of the elastic connecting member in the axial direction is able to be minimized by the presence of the recesses. This arrangement makes it possible to prevent cracking or breakage of the axially both sides of the elastic connecting members due to this expansion deformation, effectively improving durability of the dynamic damper.

A third mode of the invention provides a cylindrical dynamic damper according to the first or second modes, wherein the plurality of elastic film members comprises an even numbers of elastic film members, and circumferentially adjacent ones of the elastic film members with one of the elastic connecting members interposed therebetween are inclined to different axial sides opposite from each other. According to this mode, the elastic film members mutually inclined to opposite axial sides are disposed in good balance, thereby effectively preventing inclination of the elastic principal axis in the spring component of the dynamic damper. This arrangement makes it possible to further effectively prevent undesirable displacement of the mass member in the direction different from the vibration input direction, so that the present dynamic damper will exhibit desired vibration damping effect with efficiency.

A fourth mode of the invention provides a cylindrical dynamic damper according to any one of the first through third modes, wherein the cylindrical fastening member has an inside diameter smaller than an outside diameter of the rod shaped vibrating member, and the cylindrical fastening member is press fitted onto the rod shaped vibrating member so that the cylindrical fastening member is fixedly mounted onto the rod shaped vibrating member. According to this mode, the cylindrical dynamic damper is able to be fixedly mounted onto the rod shaped vibrating member without needing a special fastening member such as a fastening band or the like. Thus, the present dynamic damper can be readily mounted onto the rod shaped vibrating member, while ensuring a reduced number of components.

BRIEF DESCRIPTION OF THE DRAWINGS

The foregoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
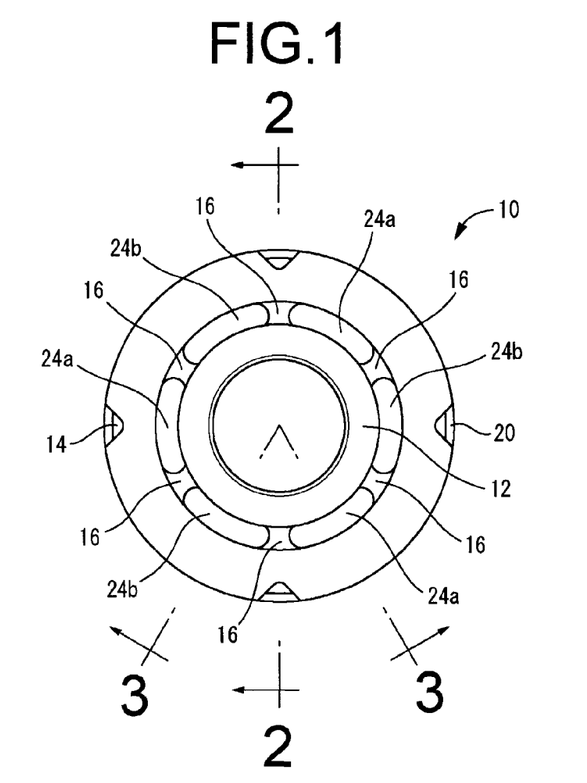
FIG. 1 is a front elevational view of a cylindrical dynamic damper of construction according to a first embodiment of the invention.
Figure 2:
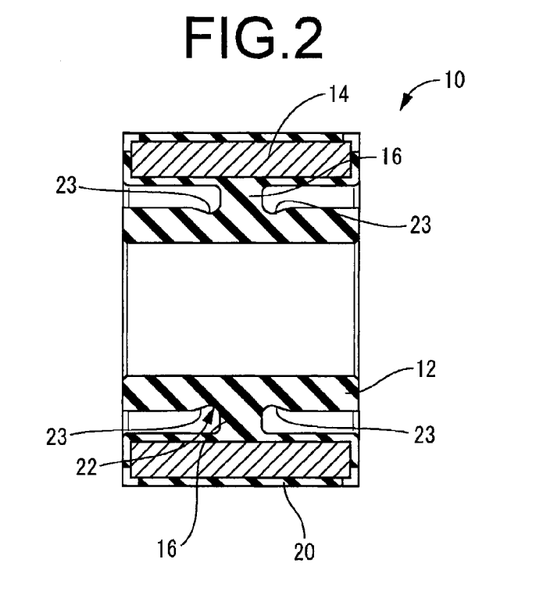
FIG. 2 is a cross sectional view of the dynamic damper of FIG. 1, taken along line 2-2 of FIG. 1.
Figure 3:
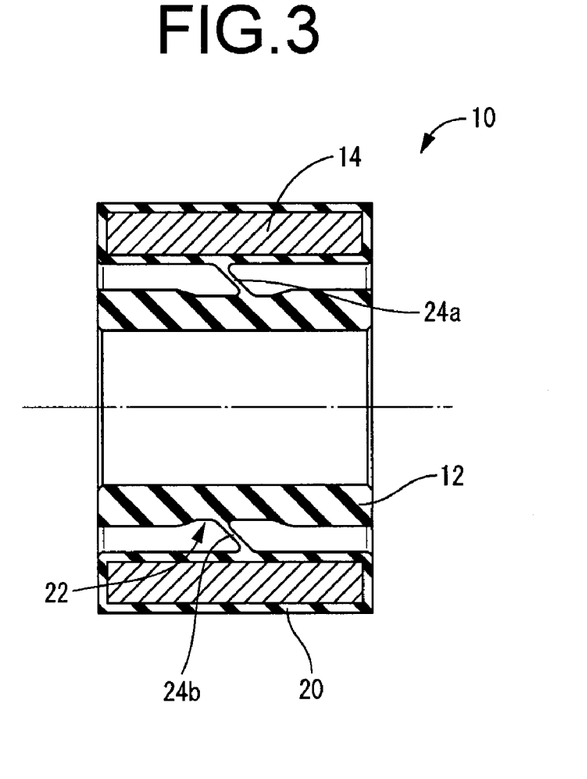
FIG. 3 is a cross sectional view of the dynamic damper of FIG. 1, taken along line 3-3 of FIG. 1.

Referring first to FIGS. 1-3, shown is a cylindrical dynamic damper 10 constructed according to a first embodiment of the invention. The dynamic damper 10 has a construction wherein an elastic mounting member 12 serving as a cylindrical fastening member and a mass member 14 are elastically connected with each other by means of a plurality of elastic support members 16 serving as elastic connecting members. The dynamic damper 10 is secured onto a drive shaft (not shown) serving as an oscillating rod member by means of the elastic mounting member 12 being fastened externally onto the drive shaft.

Described in detail, the elastic mounting member 12 is formed of a rubber material and has a cylindrical shape. The elastic mounting member 12 has an inside diameter dimension slightly smaller than an outside diameter dimension of the drive shaft, thereby ensuring sufficient press fit allowance. Accordingly, as will be described later, the dynamic damper 10 is stably attached to the drive shaft by means of the elastic mounting member 12 being externally press fit onto the drive shaft.

The mass member 14 is disposed so as to surround a diametrically external surface of the elastic mounting member 12 over an entire circumference. The mass member 14 has a cylindrical shape with a diameter larger than that of the elastic mounting member 12, and formed of a metallic material such as iron. The mass member 14 and the elastic mounting member 12 are placed in a concentric fashion, being diametrically spaced apart from each other by a prescribed distance. In other words, the inside diameter dimension of the mass member 14 is made larger than the outside diameter dimension of the elastic mounting member 12, so that the elastic mounting member 12 and the mass member 14 are diametrically spaced apart from each other by a prescribed distance over the entire circumference.

Within this diametric spacing between the elastic mounting member 12 and the mass member 14, the plurality of elastic support members 16 are formed and extend in an axis-perpendicular direction so that the elastic support members 16 connect the elastic mounting member 12 and the mass member 14 with each other. In the present embodiment, each elastic support member 16 has an axial dimension larger than its axis-perpendicular direction. The plurality of elastic support members 16 are formed extending radially outwardly in the axis-perpendicular direction from a generally central portion of the elastic mounting member 12 in the axial direction. In this embodiment in particular, the elastic support members 16 are provided in an even number, preferably six, so that mutually independent six elastic support members 16 are spaced apart from each other in the circumferential direction at a uniform interval. Besides, the elastic support members 16 are integrally formed with the elastic mounting member 12, while a rubber sheath layer 20 is integrally formed with the elastic support members 16 and covers the mass member 14 over substantially entire surface thereof. With this arrangement, the elastic mounting member 12 and the mass member 14 are connected with each other by means of the elastic support members 16. The rubber sheath layer 20 has cutouts at axially opposite ends thereof. In each end of the rubber sheath layer 20, the cutouts are formed at locations opposed to each other in two diametric directions perpendicular to each other. Therefore, eight cutouts are formed in total. The mass member 14 is exposed to the outside through these eight cutouts.

Figure 4:
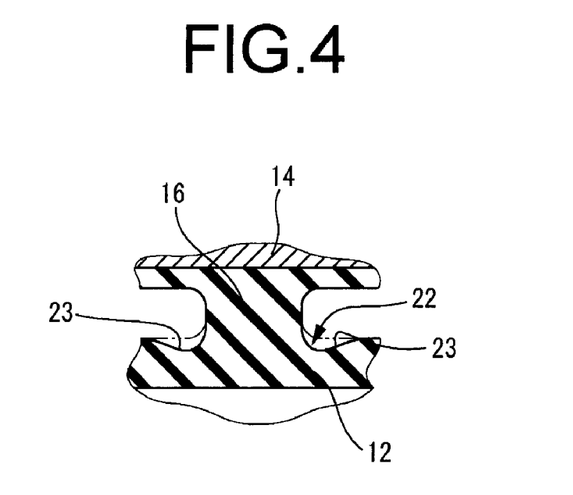
FIG. 4 is an enlarged fragmental view in cross section of the dynamic damper of FIG. 1.

The elastic mounting member 12 has a circumferential groove 22 of shallow groove shape, which is open in an outer circumferential face of the elastic mounting member 12, and which is formed at the axially central portion of the elastic mounting member 12, where the elastic support members 16 are formed. The circumferential groove 22 circumferentially extends continuously over the entire circumference with substantially unchanging cross section and has a widthwise dimension (an axial dimension) larger than an axial dimension of the each elastic support member 16. As shown in FIG. 4, the each elastic support member 16 is formed so as to extend from an axially central portion of the circumferential groove 22. With this arrangement, there is formed a recess 23 utilizing the circumferential groove 22 on axially either side of the each elastic support member 16. The recess 23 extends on axially either side of the each elastic support member 16, thereby continuously forming a border between axially either face of the each elastic support member 16 and the outer circumferential face of the elastic mounting member 12 with a smooth curving surface.

Thin rubber films 24a, 24b serving as elastic film members are formed circumferentially between the adjacent ones of the elastic support members 16. The thin rubber films 24a, 24b are formed of rubber elastic material and each has a generally planar film shape. The thin rubber films 24a, 24b according to this embodiment are integrally formed with the elastic mounting member 12 and the elastic support members 16, thereby extending so as to close off areas surrounded by the elastic mounting member 12, the mass member 14, and the elastic support members 16. Each of the thin rubber films 24a, 24b has a wall thickness sufficiently smaller than an axial thickness of the each elastic support member 16. In addition, one end of each of the thin rubber films 24a, 24b on the elastic mounting member 12 side (diametrically inside) is located on the circumferential groove 22, thereby extending outwardly from the bottom surface of the circumferential groove 22. As will be apparent from the above description, in this embodiment, the elastic support members 16 and the thin rubber films 24a, 24b are both provided in an even number, so that the thin rubber films 24a, 24b for a total of six are independently formed at respective circumferential positions located between the adjacent ones of the six elastic support members 16, respectively.

A thickness dimension of each of the thin rubber films 24a, 24b, which is not limited in any particular way, is preferably established within a range of 0.3-2.0 mm, more preferably within a range of 0.6-1.3 mm. If the thickness dimension of each of the thin rubber films 24a, 24b is too small, it may sometimes lead to deterioration of durability of the thin rubber films 24a, 24b. On the other hand, if the thickness dimension of each of the thin rubber films 24a, 24b is too large, the rigidity of the thin rubber films 24a, 24b may become higher than necessary, thereby affecting spring constants of a secondary vibration system. In addition, each of the thin rubber films 24a, 24b has a thickness dimension at its generally central, thinnest part, preferably not greater than one-half, more preferably not greater than one-third of an axial thickness dimension of the each elastic support member 16.

Each of the thin rubber films 24a, 24b has an inclined planar film shape, which extends axially inclining with respect to a plane extending in the axis-perpendicular direction. Furthermore, in this embodiment, the adjacent ones of the thin rubber films 24a, 24b in the circumferential direction incline in axially opposite directions to each other. Specifically, as shown in FIGS. 1 and 3, each thin rubber film 24a inclines diametrically outward (vertically upward in FIG. 3) so as to locate its end of the mass member 14 side (diametrically outside) axially one side (the left side in FIG. 3), while each thin rubber film 24b inclines diametrically outward (vertically downward in FIG. 3) so as to locate its end of the mass member 14 side (diametrically outside) axially the other side (the right side in FIG. 3).

An inclined angle of each of the thin rubber films 24a, 24b with respect to the plane extending in the axis-perpendicular direction, which is not limited in any particular way, is preferably set within a range of 20° to 70° (−70° to −20°), more preferably within a range of 40° to 60° (−60° to −40°). If the inclined angle is too small, displacement of the mass member 14 in the axis-perpendicular direction may cause compressive component (tensile component) to become greater, thereby affecting spring constants of the secondary vibration system. On the other hand, if the inclined angle is too large, the thin rubber films 24a, 24b, and hence the axial dimension of the dynamic damper 10 as a whole are likely to become undesirably large in size.

In this embodiment, the thin rubber films 24a, 24b are identical with one another in shape and dimension. Furthermore, the measures (absolute values) of the inclined angles of the thin rubber films 24a, 24b are equal to one another. In this embodiment, for example, the thin rubber films 24a and the thin rubber films 24b are arranged so as to incline at angles of 45° and −45°, respectively, with respect to the plane extending in the axis-perpendicular direction.

As seen in the axis-perpendicular direction, each of the thin rubber films 24a, 24b has a center of gravity located on a center axis of the each elastic support member 16 extending in the axis-perpendicular direction. In other words, axial centers of the elastic support members 16 and the thin rubber films 24a, 24b are located on the same plane extending in the axis-perpendicular direction. In addition, each of the thin rubber films 24a, 24b according to this embodiment is arranged so that an axial distance between axially opposite ends thereof is smaller than the axial dimension of the each elastic support member 16, and that the axially opposite ends thereof are formed so as not to project from axially opposite ends of the each elastic support member 16 in the axial direction.

The dynamic damper 10 constructed according to this embodiment is installed to an automotive vehicle by means of the elastic mounting member 12 being externally press fit and secured onto the drive shaft (not shown). In this embodiment in particular, the elastic mounting member 12 has the inside diameter dimension small enough for press fitting compared to the outside diameter dimension of the drive shaft. Therefore, when the dynamic damper 10 is attached onto the drive shaft, a stable installed state is attained by means of press fitting without any special components such as fastening bands.

A tightening allowance (press fit allowance): p of the elastic mounting member 12 is preferably established within a range of 5-30%, more preferably within a range of 15-25%. With this respect, the tightening allowance: p is represented by the following equation, where "B" is the inside diameter dimension of the elastic mounting member 12 prior to the press fitting, and "A" is the outside diameter dimension of the drive shaft which is equal to the inside diameter dimension of the elastic mounting member 12 after the press fitting:

$$p=((A-B)/A)\times 100 \ (\%)$$

If the tightening allowance is too small, it is likely to be difficult to attain a stable installation of the dynamic damper 10 by securing the elastic mounting member 12 press-fit onto the drive shaft. On the other hand, if the tightening allowance is too large, it may cause excessive elastic deformation of the elastic mounting member 12 due to press fitting, thereby leading to deterioration of durability.

With the dynamic damper 10 installed as stated above, the mass member 14 and the elastic support members 16 constitute the secondary vibration system with respect to a primary vibration system constituted of the drive shaft. The dynamic damper 10 can attain vibration damping action exhibited by excitation force of the mass member 14 by tuning of a resonance frequency of the secondary vibration system for a resonance frequency of the primary vibration system.

Here, upon input of vibration in the axis-perpendicular direction, the mass member 14 and the elastic mounting member 12 undergo relative displacement in the axis-perpendicular direction, which represents the input direction of principal vibration load. Consequently, the thin rubber films 24a, 24b formed between the opposite mass member 14 and elastic mounting member 12 undergo elastic deformation.

The thin rubber films 24a, 24b according to this embodiment in particular are inclined with respect to the axis-perpendicular direction. Accordingly, the thin rubber films 24a, 24b undergo mainly shearing deformation due to relative displacement of the mass member 14 and the elastic mounting member 12 in the axis-perpendicular direction. With this arrangement, the dynamic damper 10 is less likely to suffer from undesirable effect on the spring constants of the secondary vibration system due to elastic deformation of the thin rubber films 24a, 24b, in comparison with the case where thin rubber films are disposed so as to extend in the axis-perpendicular direction and undergo compressive or tensile deformation due to displacement of the mass member 14. Therefore, it is possible to tune the resonance frequency of the secondary vibration system with high accuracy by adjusting spring constants of the elastic support members 16, whereby the dynamic damper 10 can effectively exhibit vibration damping action in an intended frequency band.

Furthermore, in this embodiment, the adjacent ones of the thin rubber films 24a, 24b circumferentially situated on either side of the each elastic support member 16 incline in opposite directions to each other. Accordingly, it is possible to minimize or avoid inclination of the principal elastic axis of the secondary vibration system in the axial direction, thereby preventing the mass member 14 from being displaced with swinging motion in the twisting or prizing direction with respect to the elastic mounting member 12. Thus, the dynamic damper 10 can efficiently attain vibration damping action by transmitting generating force of the mass member 14 effectively to the drive shaft. In this embodiment in particular, the dimension of the each elastic support member 16 is made larger in the axial direction rather than in the axis-perpendicular direction. This arrangement makes it possible to prevent relative displacement of the mass member 14 in the twisting or prizing direction with respect to the elastic mounting member 12 more effectively, thereby attaining more effective vibration damping action.

Additionally, in this embodiment in particular, the thin rubber films 24a, 24b of generally identical shape are formed and arranged at a uniform interval in the circumferential direction for a total of six. More specifically, three thin rubber films 24a and three thin rubber films 24b, which incline in axially opposite directions to each other are formed and arranged in an alternate fashion in the circumferential direction. With this arrangement, it is possible to avoid inclination of the principal elastic axis of the secondary vibration system more effectively, thereby attaining more efficient vibration damping action.

Further, in this embodiment, the elastic mounting member 12 has the inside diameter dimension small enough for press fitting compared to the outside diameter dimension of the drive shaft. This enables the dynamic damper 10 to attain sufficient mounting force with respect to the drive shaft by means of the elastic mounting member 12 being externally press fit and secured onto the drive shaft. Therefore, the dynamic damper 10 according to this embodiment is easy to attach onto the drive shaft without separately employing any special means such as fastening bands. In this embodiment in particular, inclination of the thin rubber films 24a, 24b can minimize or avoid occurrence of folded or overlapped state of the thin rubber films 24a, 24b themselves even in the case where the inside diameter dimension of the elastic mounting member 12 is made small enough for press fitting in an initial state and is enlarged to relatively great extent upon installation. Thus, the dynamic damper 10 can attain the tightening allowance of the elastic mounting member 12 with respect to the drive shaft.

Still further, in this embodiment, the dynamic damper 10 is less likely to suffer from undesirable effect by the thin rubber films 24a, 24b in the secondary vibration system. Accordingly, it is possible to use rubber material with high rubber hardness in comparison with dynamic dampers of conventional construction affected by thin rubber films to relatively large extent for a constructive reason. Therefore, the dynamic damper 10 can attain tightening force of the elastic mounting member 12 with respect to the drive shaft more effectively, thereby being attached onto the drive shaft more advantageously without any fastening bands.

As shown in FIG. 4, the dynamic damper 10 according to this embodiment has the circumferential groove 22 opening in the outer circumferential face of the elastic mounting member 12 and extending over the entire circumference, and from the bottom surface of which the elastic support members 16 and the thin rubber films 24a, 24b are extending. When the elastic mounting member 12 is fastened externally onto the drive shaft and is thereby expanded, the elastic support members 16 are subjected to compressive deformation in the axis-perpendicular direction. Even in such case, the dynamic damper 10 arranged as described above enables the rubber material to escape to the circumferential groove 22 as indicated by chain double-dashed lines in FIG. 4, thereby minimizing or avoiding expansion deformation of the elastic support members 16 in the axial or circumferential direction. As a result, it is possible to prevent axially side faces of the elastic support members 16 from cracking due to a tensile stress caused by arcuate expansion thereof. Thus, the dynamic damper 10 is able to advantageously avoid deterioration of its durability. It should be noted that the each elastic support member 16 is formed in a widthwise central portion of the circumferential groove 22 and has the axial dimension smaller than the axial (widthwise) dimension of the circumferential groove 22. Thus the recess 23 is formed utilizing the circumferential groove 22 located on axially either side of the each elastic support member 16. This arrangement makes it possible to advantageously avoid expansion deformation of the elastic support members 16 in the axial direction.

Furthermore, the axially either face of the each elastic support member 16 is formed continuously with the outer circumferential face of the elastic mounting member 12 via the recess 23, whereby the border between the axially either side of the each elastic support member 16 and the elastic mounting member 12 is formed with the smooth bowing surface. With this arrangement, a border area between the elastic mounting member 12 and the axially either side of the each elastic support member 16 has a free surface area large enough to disperse stress affected by displacement of the mass member 14 upon input of vibration, thereby improving durability. In this embodiment in particular, circumferentially either side of the each elastic support member 16 is also formed continuously with the outer circumferential face of the elastic mounting member 12 with a smooth surface. Accordingly, it is also possible to disperse stress acting on a border area between the circumferentially either side of the each elastic support member 16 and the outer circumferential face of the elastic mounting member 12, thereby further improving durability. In the present embodiment, the smooth curving surface refers to a curving face having no break points or broken lines.

Figure 5:
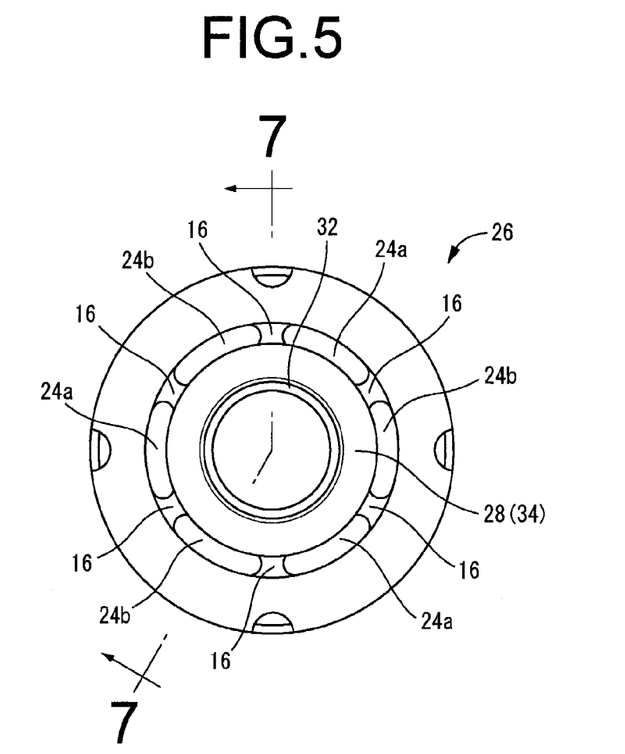
FIG. 5 is a front elevational view of a cylindrical dynamic damper of construction according to a second embodiment of the invention.
Figure 6:
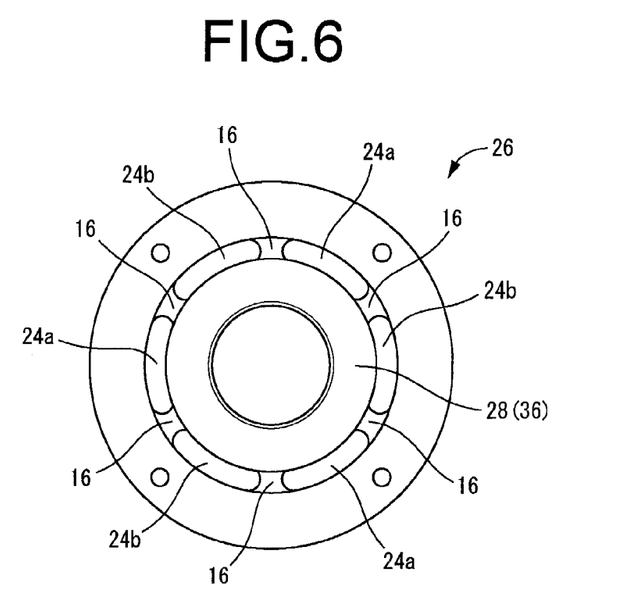
FIG. 6 is a rear elevational view of the dynamic damper of FIG. 5.
Figure 7:
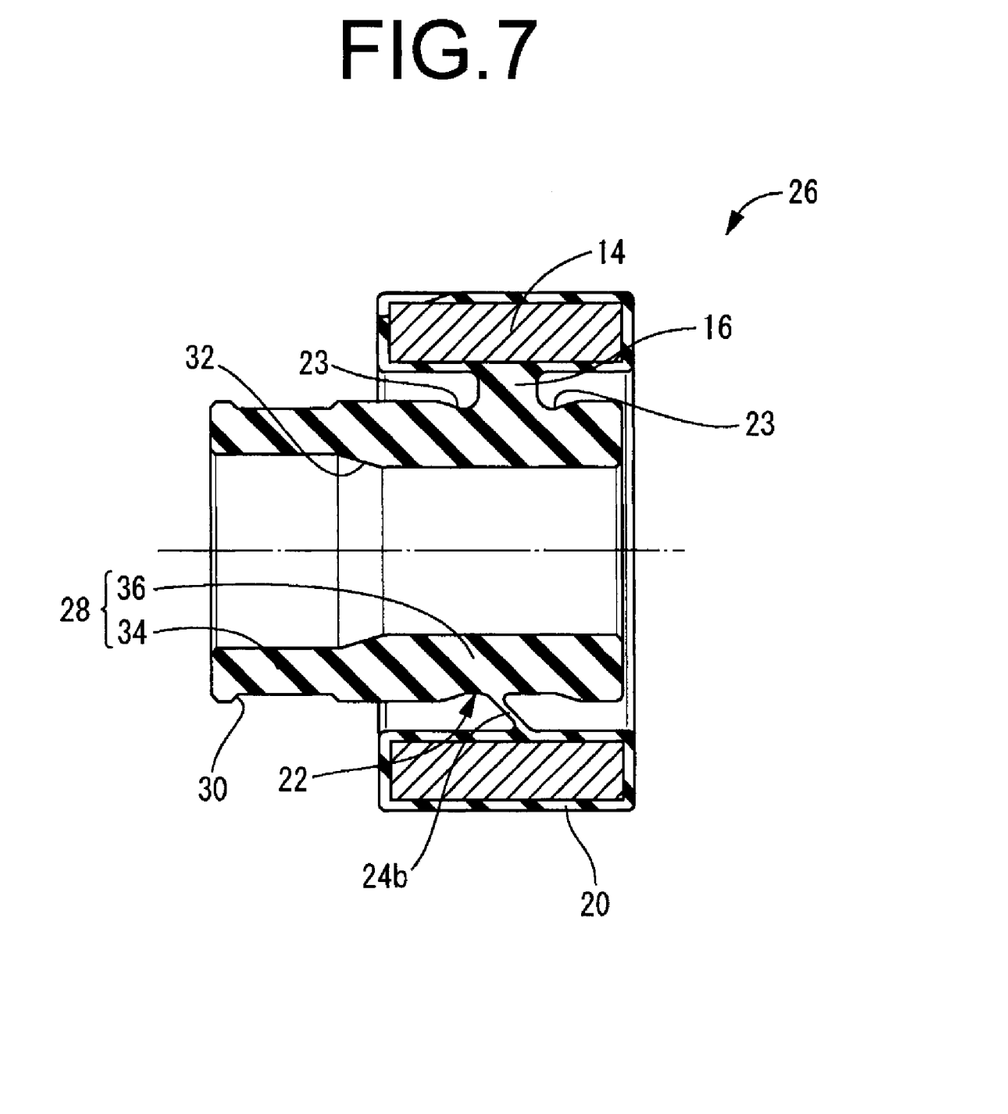
FIG. 7 is a cross sectional view of the dynamic damper of FIG. 5, taken along line 7-7 of FIG. 5.

Referring next to FIGS. 5-7, there is shown a cylindrical dynamic damper 26 according to a second embodiment of the present invention. In the following explanation, the same reference numerals as used in the illustrated embodiment are used for identifying structurally and functionally corresponding elements, to facilitate understanding of the instant embodiment.

Specifically, the dynamic damper 26 according to this embodiment has an elastic mounting member 28 whose one axial end is projecting outwardly from an axial end of the mass member 14. A fastening band (not shown) is fastened externally onto this projecting end and the dynamic damper 26 is secured onto a drive shaft (not shown) by tightening up the fastening band.

Described in detail, the elastic mounting member 28 is of generally cylindrical shape overall and has an axial dimension larger than that of the mass member 14. The elastic mounting member 28 has a shallow band receiving groove 30 formed in proximity to its end on one axial side which opens in an outer circumferential face thereof and circumferentially extends continuously over the entire circumference. As shown in FIG. 7, the elastic mounting member 28 has its inside diameter dimension varied in an axial direction, namely, the elastic mounting member 28 has a large-diameter portion 34 on one axial side of a tapered section 32 formed in an axial medial portion and a small-diameter portion 36 on the other axial side of the tapered section 32 whose inside diameter is smaller than that of the large-diameter portion 34. With this arrangement, the elastic mounting member 28 is made thinner in an area where the band receiving groove 30 is formed, whereby the fastening band (not shown) can exhibit its tightening force effectively. With respect to the inside diameter dimension of the elastic mounting member 28, both the large-diameter portion 34 and the small-diameter portion 36 have smaller dimensions than an outside diameter dimension of the drive shaft.

The elastic mounting member 28 and the mass member 14 are disposed in a concentric fashion and connected with each other by the elastic support members 16. In other words, as in the first embodiment described previously, the mass member 14 is elastically supported by the elastic mounting member 28 via the elastic support members 16. Besides, in this embodiment, the one axial end of the elastic mounting member 28 is projecting axially outward from the end of the mass member 14. With this arrangement, the band receiving groove 30 is positioned axially outward from the mass member 14. Additionally, in this embodiment, the other axial end of the elastic mounting member 28 is placed slightly inward in the axial direction from the end of the mass member 14.

The dynamic damper 26 constructed according to this embodiment is secured to the drive shaft by means of the elastic mounting member 28 being externally press fit as well as being tightening up by a fastening band (not shown) onto the drive shaft. The elastic mounting member 28 has the inside diameter dimension smaller than the outside diameter dimension of the drive shaft, whereby an inner circumferential face of the elastic mounting member 28 comes into close contact with an outer circumferential face of the drive shaft.

The dynamic damper 26 constructed according to this embodiment can exhibit efficient vibration damping action similar to the dynamic damper 10 constructed according to the first embodiment.

In this embodiment, the dynamic damper 26 of a type tightened and secured by a fastening band has the elastic mounting member 28 whose inside diameter is made smaller than the outside diameter of the drive shaft and being externally press fit onto the drive shaft. Therefore, the inner circumferential face of the elastic mounting member 28 comes into close contact with an outer circumferential face of the drive shaft, thereby preventing water or the like from infiltrating between the superposed faces of the elastic mounting member 28 and the drive shaft. In addition, more stable installed state is attained by means of the elastic mounting member 28 being press fit onto the drive shaft in comparison with the case where the dynamic damper 26 is attached to the drive shaft only by a fastening band.

Furthermore, the dynamic damper 26 constructed according to this embodiment has the elastic mounting member 28 whose inside diameter dimension is varied in the axial direction so as to have the relatively thin, large-diameter portion 34 on which a fastening band is attached. Therefore, the dynamic damper 26 can enjoy effective tightening force of the fastening band, thereby exhibiting a stable installed state with respect to the drive shaft.

While the present invention has been described in detail in its presently preferred embodiment, for illustrative purpose only, it is to be understood that the invention is by no means limited to the details of the illustrated embodiment, but may be otherwise embodied. It is also to be understood that the present invention may be embodied with various changes, modifications and improvements which may occur to those skilled in the art, without departing from the spirit and scope of the invention.

For example, whereas in the first and second embodiments the elastic support members 16 are formed and arranged at a uniform interval in the circumferential direction, the elastic support members 16 are not necessarily arranged at a uniform interval in the circumferential direction. Particularly in the cases where for example the input direction of principal vibration load is limited to a specific diametrical direction, it is possible to attain vibration damping action advantageously by varying the intervals between the elastic support members 16 and hence the rigidity in the circumferential direction. Meanwhile, whereas in the first and second embodiments the plurality of elastic support members 16 of identical shape are formed, it is also possible to vary the rigidity in the circumferential direction by adopting a combination of the elastic support members 16 having different shapes.

The thin rubber films 24a, 24b formed circumferentially between the adjacent ones of the elastic support members 16 are not necessarily of identical shape. Alternatively, a combination of thin rubber films 24a, 24b having different thicknesses or planar shapes may also be employable. Further, the inclined angles of the thin rubber films 24a, 24b are in no way limited to that taught in the specific disclosure of the first and second embodiments herein. Still further, the measures of the inclined angles of the plurality of the thin rubber films 24a, 24b need not be equal, but may alternatively be different from one another. Specifically, for example, it is possible to adjust a spring constant of each of the dynamic dampers 10, 26 in the axis-perpendicular direction by adjusting each inclined angle of the plurality of the thin rubber films 24a, 24b and varying those angles in the circumferential direction, thereby varying the spring constants of the thin rubber films 24a, 24b in the circumferential direction.

The elastic support members 16 and the thin rubber films 24a, 24b are provided preferably in an even number in order to avoid inclination of the principal elastic axis of the spring of the secondary vibration system. However, the elastic support members 16 and the thin rubber films 24a, 24b are not necessarily provided in an even number. Alternatively, for example, it is possible to form five elastic support members 16 and the thin rubber films 24a, 24b for a total of five circumferentially between the adjacent ones of the five elastic support members 16. This arrangement also is able to avoid inclination of the principal elastic axis of the spring of the secondary vibration system in the axial direction. It is to be understood that the specific number of the elastic support members 16 and the thin rubber films 24a, 24b described above, for illustrative purpose only, may otherwise be established appropriately.

As described in the preferred embodiments above, the adjacent ones of the thin rubber films 24a, 24b are preferably inclined in axially opposite directions to each other. However, it is not essential that the adjacent ones of the thin rubber films 24a, 24b incline in opposite directions to each other. For example, at least one set of the adjacent ones of the thin rubber films 24a, 24b may incline in the same axial directions. Furthermore, it is sufficient for the thin rubber films 24a, 24b to incline at least in the axial direction. Specifically, the thin rubber films 24a, 24b may incline not only in axial direction but also in another direction.

The thickness dimension of each of the thin rubber films 24a, 24b need not be constant, but may alternatively be varied throughout its entirety. For example, each of the thin rubber films 24a, 24b may be made thicker in its basal end portion than in its central portion.

Furthermore, the measure of inclined angle of each thin rubber film 24a/24b need not be constant all the way of its diametric direction, but may alternatively be varied unless reversely inclined in the axial direction. For example, at least one thin rubber film 24a/24b may have an inclined angle at its basal end portion larger than that at its central portion.

The principle of the present invention can be favorably applied not only to the dynamic dampers 10, 26 for a drive shaft of an automotive vehicle as described in the first and second embodiments above, but also to other types of vibration-damping dynamic dampers for a various kinds of oscillating rod members.

It is also to be understood that the present invention may be embodied with various other changes, modifications and improvements, which may occur to those skilled in the art, without departing from the spirit and scope of the invention defined in the following claims.

What is claimed is:

1. A cylindrical dynamic damper for installing on a rod shaped vibrating member, the damper comprising:
   a cylindrical fastening member formed of an elastic body and adapted to be disposed about and fitted onto the rod shaped vibrating member;
   a mass member of tubular shape having a diameter larger than the cylindrical fastening member and disposed concentrically about the cylindrical fastening member;
   a plurality of elastic connecting members disposed between opposing faces of the cylindrical fastening member and the mass member at respective circumferential positions so as to extend in a radial direction; and
   a plurality of thin elastic film members, which are disposed between and integrally formed with circumferentially adjacent ones of the elastic connecting members, elastically connecting the cylindrical fastening member and the mass member so that the mass member is elastically supportable by the rod shaped vibrating member,
   wherein the thin elastic film members are inclined to one axial side, with the thin elastic film members that are diametrically opposed to each other being inclined to opposite axial sides in relation to each other.

2. A cylindrical dynamic damper according to claim 1, wherein the cylindrical fastening member has a pair of recesses, one on each side along the axial direction, adjacent to each of the elastic connecting members.

3. A cylindrical dynamic damper according to claim 1, wherein the plurality of thin elastic film members are even in number, and circumferentially adjacent ones of the thin elastic film members with one of the elastic connecting members interposed therebetween are inclined to different axial sides opposite from each other.

4. A cylindrical dynamic damper according to claim 1, wherein:
the cylindrical fastening member has an inside diameter configured to be smaller than an outside diameter of the rod shaped vibrating member, and
the cylindrical fastening member configured to be press fitted onto the rod shaped vibrating member so that the cylindrical fastening member is fixedly mounted onto the rod shaped vibrating member.

5. A cylindrical dynamic damper according to claim 1, wherein each of the thin elastic film members has a wall thickness within a range of 0.3-2.0 mm.

6. A cylindrical dynamic damper according to claim 1, wherein each of the thin elastic film members has an inclined angle within a range of ±20°-70° with respect to a plane extending in the axis-perpendicular direction.

7. A cylindrical dynamic damper according to claim 1, wherein each of the thin elastic film members has a center of gravity located on a center axis of each of the elastic connecting members extending in the axis-perpendicular direction.

8. A cylindrical dynamic damper according to claim 1, wherein a tightening allowance of the cylindrical fastening member is held within a range of 5-30%.

9. A cylindrical dynamic damper according to claim 1, wherein each of the thin elastic connecting members has an axial dimension greater than a dimension thereof in the radial direction.

* * * * *